(12) United States Patent
Patel

(10) Patent No.: US 7,642,933 B2
(45) Date of Patent: Jan. 5, 2010

(54) METHODS AND DEVICES FOR KEYPRESS VALIDATION IN A SLIDER FORM FACTOR DEVICE

(75) Inventor: Chirag K. Patel, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 601 days.

(21) Appl. No.: 11/565,234

(22) Filed: Nov. 30, 2006

(65) Prior Publication Data

US 2008/0129554 A1    Jun. 5, 2008

(51) Int. Cl.
*H03M 11/00* (2006.01)
(52) U.S. Cl. .............................. 341/22; 341/20; 439/10; 345/169; 361/679; 455/575.1; 455/575.4
(58) Field of Classification Search .................. 341/20, 341/22; 439/10; 345/169; 361/679; 455/575.1, 455/575.4; 710/15
See application file for complete search history.

(56) References Cited

U.S. PATENT DOCUMENTS

| | | | |
|---|---|---|---|
| 4,845,722 A | 7/1989 | Kent et al. | |
| 7,410,360 B2 * | 8/2008 | Pan | 439/10 |
| 7,422,436 B2 * | 9/2008 | Lee | 439/10 |
| 7,426,115 B2 * | 9/2008 | Shih et al. | 361/756 |
| 2004/0235540 A1 | 11/2004 | Yajima | |
| 2005/0070348 A1* | 3/2005 | Lee et al. | 455/575.4 |
| 2005/0104857 A1* | 5/2005 | Jacobs et al. | 345/169 |
| 2005/0125570 A1* | 6/2005 | Olodort et al. | 710/15 |
| 2006/0061943 A1* | 3/2006 | Santos et al. | 361/679 |
| 2006/0063569 A1* | 3/2006 | Jacobs et al. | 455/575.1 |
| 2006/0226150 A1* | 10/2006 | Pan | 220/345.1 |

* cited by examiner

*Primary Examiner*—Albert K Wong

(57) ABSTRACT

Disclosed are methods in a slider form factor device, and slider form factor devices, for ignoring a key depression when there is a change in the position of a first housing relative to a second housing that occurs between the key depression and the release of the key depression. The method may include detecting a key depression of the first housing, detecting a change in the position of the first housing relative to the second housing, and detecting a release of the key depression. The method may further include ignoring the key depression when there is a change in the position of the first housing relative to the second housing that occurs between the key depression and the release of the key depression.

20 Claims, 2 Drawing Sheets

METHODS AND DEVICES FOR KEYPRESS VALIDATION IN A SLIDER FORM FACTOR DEVICE

FIELD

Described are methods in slider form factor devices for processing key input, and more particularly for ignoring a key depression when there is a change in the position of a first housing relative to a second housing that occurs between the key depression and the release of the key depression.

BACKGROUND

Mobile communication devices may have different form factors such as candy bar, rotator, clam shell and slider form factors. In a mobile communication device with a slider form factor, two housings may be referred to as a base housing and a slider housing. In a mobile communication device with a slider form factor, keys for user input can be located on both housing. It may happen that a user accidentally presses and holds a key while he or she is sliding the slide up (open) or down (close), eventually releasing the key once the slide has been fully opened or closed. Accordingly, in a slider form factor, there may be slider key falsing while a user is trying to open and/or close the slide.

Slider key falsing may occur under different circumstances. In one example, when a user wishes to put the telephone away into his or her pocket, in the process of closing the slide down, the user may unintentionally activate one of the soft keys which is programmed for a video camera. Were the camera equipped with a 700 mA-hr Li-Ion battery, video camera activation may draw over 100 mA constant current so that the battery may die in less than seven hours.

In one solution, manufactures have included a slide lock or a keypad lock in software. In another solution, manufactures have included a spring latch for opening the slider. However, even with these solutions, slider key falsing can persist.

DETAILED DESCRIPTION

A solution to false key pressing in a slider form factor electronic device may be beneficial. Disclosed are methods and devices for ignoring a key depression when there is a change in the position of a first housing relative to a second housing that occurs between the key depression and the release of the key depression. The method may include detecting a key depression of the first housing, detecting a change in the position of the first housing relative to the second housing, and detecting a release of the key depression. The method may further include ignoring the key depression when there is a change in the position of the first housing relative to the second housing that occurs between the key depression and the release of the key depression.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
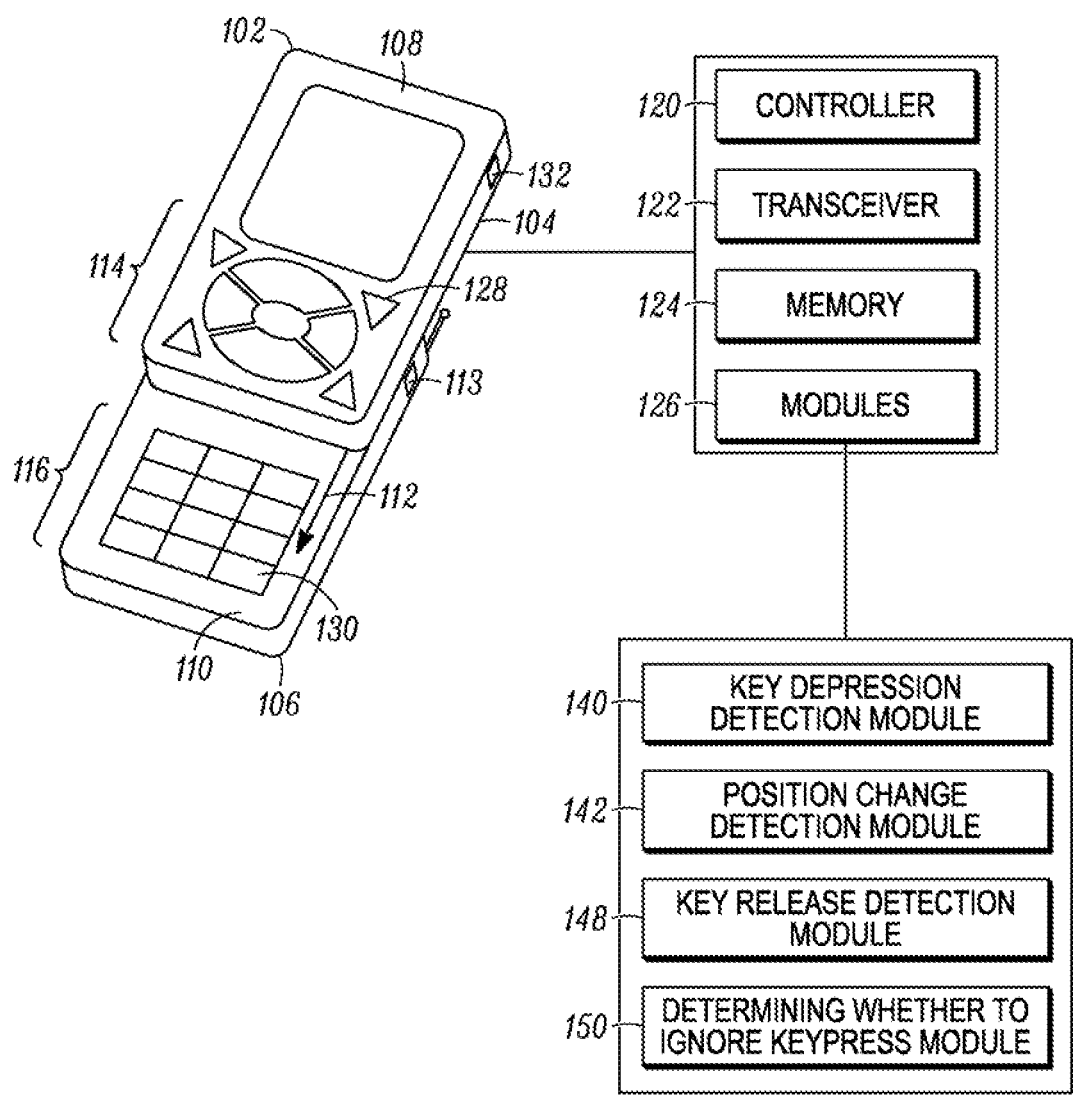
FIG. 1 depicts an embodiment of a mobile communication device having a slider form factor.

FIG. 1 depicts an embodiment of a mobile communication device 102 having a slider form factor. Such a mobile communication device 102 may have a first housing 104 and a second housing 106. For convenience in this description, housing 104 is named the first housing and housing 106 is named the second housing. It is understood that while the present description will refer to housing 104 as the first housing, housing 106 may also be referred to as the first housing. It is further understood that while the present description will refer to housing 106 as the second housing, housing 104 may also be referred to as the second housing. Each housing 104 and 106 can have an exterior face 108 and 110.

The mobile communication device 102 can be any type of mobile communication device. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Wireless communication technologies may include, for example, voice communication, the capability of transferring digital data, SMS messaging, Internet access, multi-media content access and/or voice over internet protocol (VoIP).

The first housing 104 may have a position relative to the second housing 106 and configurable to be in-line with the second housing 106. An arrow 112 indicates a direction in which the first housing 104 and the second housing 106 may be movable with respect to one another. As with mobile communication devices having other form factors, the slider form factor device may receive input so that a change in the position of the first housing 104 relative to the second housing 106 generates a change in an activation state or a deactivation state of the device 102. It is understood that the change in state of the device 102 may be indicated by a change, for example, in the position of the first housing 104 relative to the second housing 106. Moreover, a change in state of the device 102 may include a change in the state of, for example, a fastener or a control mechanism of the device 102 such as a hook switch or spring latch 113. It is understood that any position detection mechanism may detect a change in the relative positions of the first housing 104 and the second housing 106.

Each face 108 and 110 may include input keys 114 and 116. While the input keys 114 and 116 are depicted as navigation keys, soft keys, and a keypad, it is understood that the keys 114 and 116 may take any form. For example, in this description it is understood that an input key may be a touch sensitive surface. A touch sensitive surface may be, for example, resistive or capacitive. The location of the keys 114 and 116 may be reversed from that which is depicted and the keys may include any input function.

The mobile communication device 102 is further depicted as including a controller 120, a transceiver 122, memory 124 and modules 126. Modules 126 may include, for example, a key depression detection module 140 including instructions to detect a key depression of the first housing 104 or second housing 106. Modules 126 may further include a position change detection module 142 including instructions to detect a change in the position of the first housing 104 relative to the second housing 106, and a key release detection module 148 including instructions to detect a release of the key depression. Moreover, modules 126 may include a determination module 150 including instructions to ignore the key depression and the release of the key depression of the first housing 104 or second housing 106 when there is a change in the position of the first housing 104 relative to the second housing 106 that occurs between the key depression and the release of the key depression.

The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

The controller 120 may be configured to process instructions of modules 126. At least one input key, for example key 128 on the exterior face 108 of the first housing 104, can be coupled to the controller 120, so that the controller can process key input. Key 128, for example, may be a soft key. Alternatively or in addition, at least one input key, for example key 130 on the exterior face 110 of the first housing 106, can be coupled to the controller 120. As mentioned above, the descriptions relative to the first housing 104 and the second housing 106 may be interchangeable.

As mentioned above, a key depression detection module 140 may include instructions to detect a key depression, for example of the first housing 104. Key depress and release are described in more detail referring to FIGS. 2 and 3 below. A key depression may activate a function of the device 102. For example key 128 may be a soft key that activates a video camera 132 of the device. Also mentioned above, a key release detection module 148 may include instructions to detect a release of the key depression.

Figure 2:
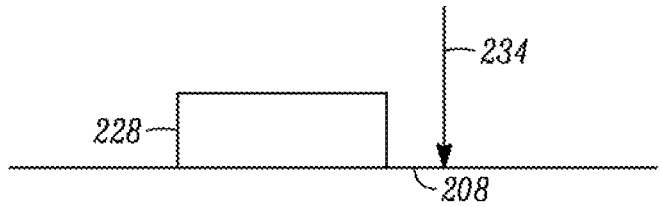
FIG. 2 illustrates a side view of an embodiment of a key in its resting position.

FIG. 2 illustrates a side view of an embodiment of a key 228 in its resting position. That is, before depression, or after release, key 228 may be above a surface 208. It is understood that the resting position of key 228 may be at any level with respect to the surface 208 and that FIG. 2 is for illustrative purposes. Arrow 234 indicates a direction relative to the surface 208 the key 328 may take during its depression.

Figure 3:
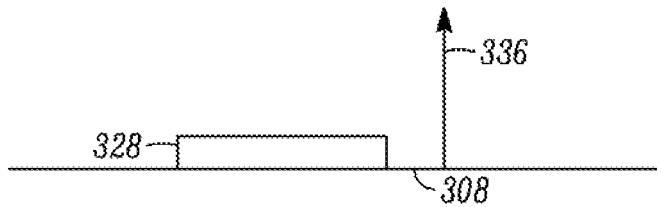
FIG. 3 illustrates a side view of an embodiment of a key when it is depressed.

FIG. 3 illustrates a side view of an embodiment of a key 328 when it is depressed. A depressed key 328 is depicted near the surface 308. It is understood that the depressed position of key 328 may be at any level with respect to the surface 308 and that FIG. 3 is for illustrative purposes. Arrow 336 indicates a direction relative to the surface 308 the key 328 may take during its release.

In an embodiment where user input may be received by an activation of a touch sensitive surface on the device 102, a resistive or capacitive input function may be considered equivalent to a key depression and/or release. It is understood that input to a touch sensitive surface is within the scope of this discussion. It is understood that a touch sensitive surface is a user input device in the same way as a key is a user input device.

Figure 4:
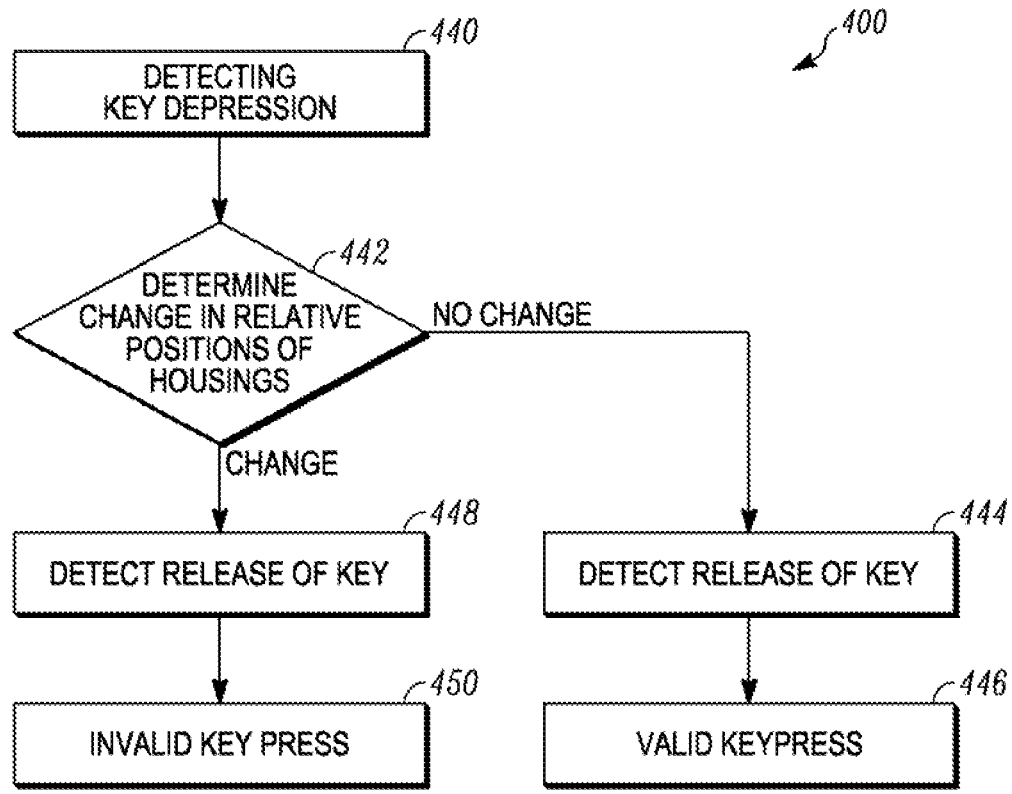
FIG. 4 is a flowchart of an embodiment of the methods presently described.

FIG. 4 is a flowchart of an embodiment 400 of the methods presently described. The method 400 may include detecting a key depression 440 of the first housing 104 (see FIG. 1) according to the key depression detection module 140 including instructions to detect a key depression of the first housing 104 or second housing 106. The method may further include determining whether there is a change in the position of the housings 442 such as a change in the position of the first housing 104 relative to the second housing 106 according to a position change detection module 142 that may include instructions to detect a change in the position of the first housing relative to the second housing. The controller 120 may process instructions related to the key depression 234 (see FIG. 2) and the release 336 (see FIG. 3) of the key depression of the first housing 104 or the second housing 106 when there is no change in the position of the first housing 104 relative to the second housing 106 that occurs between the key depression 234 and the release 336 of the key depression. If there is no detected change in the position of the first housing 104 relative to the second housing 106 before there is detection of a release of a depressed key 444, then the method may include finding the key press 440 to be a valid key press 446.

As mentioned, the method may further include determining whether there is a change in the position of the housings 442 such as a change in the position of the first housing 104 (see FIG. 1) relative to the second housing 106 according to a position change detection module 142 that may include instructions to detect a change in the position of the first housing 104 relative to the second housing 106. A detected change in the position of the first housing 104 relative to the second housing 106 before there is detection of a release of a depressed key 448 may indicate an invalid key press 450. That is, according to a key release detection module 148 that may include instructions to detect a release 336 (see FIG. 3) of the key depression, then the method may include finding the key press 440 to be an invalid key press 450.

Detecting a release of the key depression 448 after detecting a change in the relative positions of the housings 104 and 106 (see FIG. 1) may result in ignoring the key depression when there is a change in the position of the first housing 104 relative to the second housing 106 that occurs between the key depression 234 (see FIG. 2) and the release of the key depression 336 (see FIG. 3). Determining whether to find a key press to be invalid 450 or valid 446 may be according to the determination module 150 including instructions to ignore the key depression 234 (see FIG. 2) and the release 336 (see FIG. 3) of the key depression of the first housing 104 or second housing 106 when there is a change in the position of the first housing 104 relative to the second housing 106 that occurs between the key depression 234 and the release of the key depression 336.

A solution to false key pressing in a slider form factor electronic device may be beneficial. The disclosed methods and devices for ignoring a key depression when there is a change in the position of a first housing relative to the second housing that occurs between the key depression and the release of the key depression may determine an invalid key press. The method may include detecting a key depression of a first housing, detecting a change in the position of the first housing relative to the second housing, and detecting a release of the key depression. The method may further include ignoring the key depression since it may be an invalid key press when there is a change in the position of the first housing relative to the second housing that occurs between the key depression and the release of the key depression.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method in a mobile communication device having a first housing and a second housing, the first housing having an exterior face and including at least one input key, the first housing having a position relative to the second housing and configurable to be in-line with the second housing, and the first housing and the second housing being movable with respect to one another, the method comprising:
   detecting a key depression of a key of the first housing;
   detecting a change in the position of the first housing relative to the second housing;
   detecting a release of the key depression; and
   ignoring the key depression when there is a change in the position of the first housing relative to the second housing that occurs between the key depression and the release of the key depression.

2. The method of claim 1, wherein ignoring the key depression includes ignoring the release of the key depression.

3. The method of claim 1, wherein detecting a change in the position of the first housing relative to the second housing comprises:
   determining a change in an activation state or a deactivation state of the device.

4. The method of claim 1, wherein detecting a change in the position of the first housing relative to the second housing comprises:
   sensing a state of a hook switch of the device or of a spring latch of the device.

5. The method of claim 1, wherein the at least one input key is a touch sensitive surface.

6. The method of claim 1, wherein the at least one input key is a navigation key.

7. The method of claim 1, wherein the at least one input key is a soft key.

8. A method in a mobile communication device having a first housing and a second housing, the first housing having an exterior face and including at least one input key, the first housing having a position relative to the second housing and configurable to be in-line with the second housing, and the first housing and the second housing being movable with respect to one another to activate or deactivate the mobile communication device, the method comprising:
   detecting a key depression of a key of the first housing;
   monitoring whether there is a change in the position of the first housing relative to the second housing;
   detecting a release of the key depression; and
   processing instructions related to the key depression and the release of the key depression of the first housing when there is no change in the position of the first housing relative to the second housing that occurs between the key depression and the release of the key depression.

9. The method of claim 8, wherein monitoring a change in the position of the first housing relative to the second housing comprises:
   determining a change in an activation state or a deactivation state of the device.

10. The method of claim 8, wherein monitoring a change in the position of the first housing relative to the second housing comprises:
    sensing a state of a hook switch of the device or of a spring latch of the device.

11. The method of claim 8, wherein the at least one key is a touch sensitive surface.

12. The method of claim 8, wherein the at least one input key is a navigation key.

13. The method of claim 8, wherein the at least one input key is a soft key.

14. A mobile communication device having a first housing and a second housing, the first housing having an exterior face, the first housing having a position relative to the second housing and configurable to be in-line with the second housing, and the first housing and the second housing being movable with respect to one another, the device comprising:
    a controller configured to process instructions;
    at least one input key on the exterior face of the first housing, the at least one input key coupled to the controller;
    a key depression detection module including instructions to detect a key depression of a key of the first housing;
    a position change detection module including instructions to detect a change in the position of the first housing relative to the second housing;
    a key release detection module including instructions to detect a release of the key depression; and
    a determination module including instructions to ignore the key depression and the release of the key depression of the first housing when there is a change in the position of the first housing relative to the second housing that occurs between the key depression and the release of the key depression.

15. The mobile communication device of claim 14 wherein the determination module is further configured to process instructions related to the key depression and release of the key depression of the first housing when there is no change in the position of the first housing relative to the second housing that occurs between the key depression and the release of the key depression.

16. The device of claim 14, wherein a change in the position of the first housing relative to the second housing comprises a change in an activation state or a deactivation state of the device.

17. The device of claim 14, wherein a change in the position of the first housing relative to the second housing includes a change in a state of a hook switch of the device or of a spring latch of the device.

18. The device of claim 14, wherein the at least one key is a touch sensitive surface.

19. The device of claim 14, wherein the at least one input key is a navigation key.

20. The device of claim 14, wherein the at least one input key is a soft key.

* * * * *